J. D. WILSON.
FOUNTAIN CUSPIDOR.
APPLICATION FILED AUG. 11, 1909.
975,308.
Patented Nov. 8, 1910.
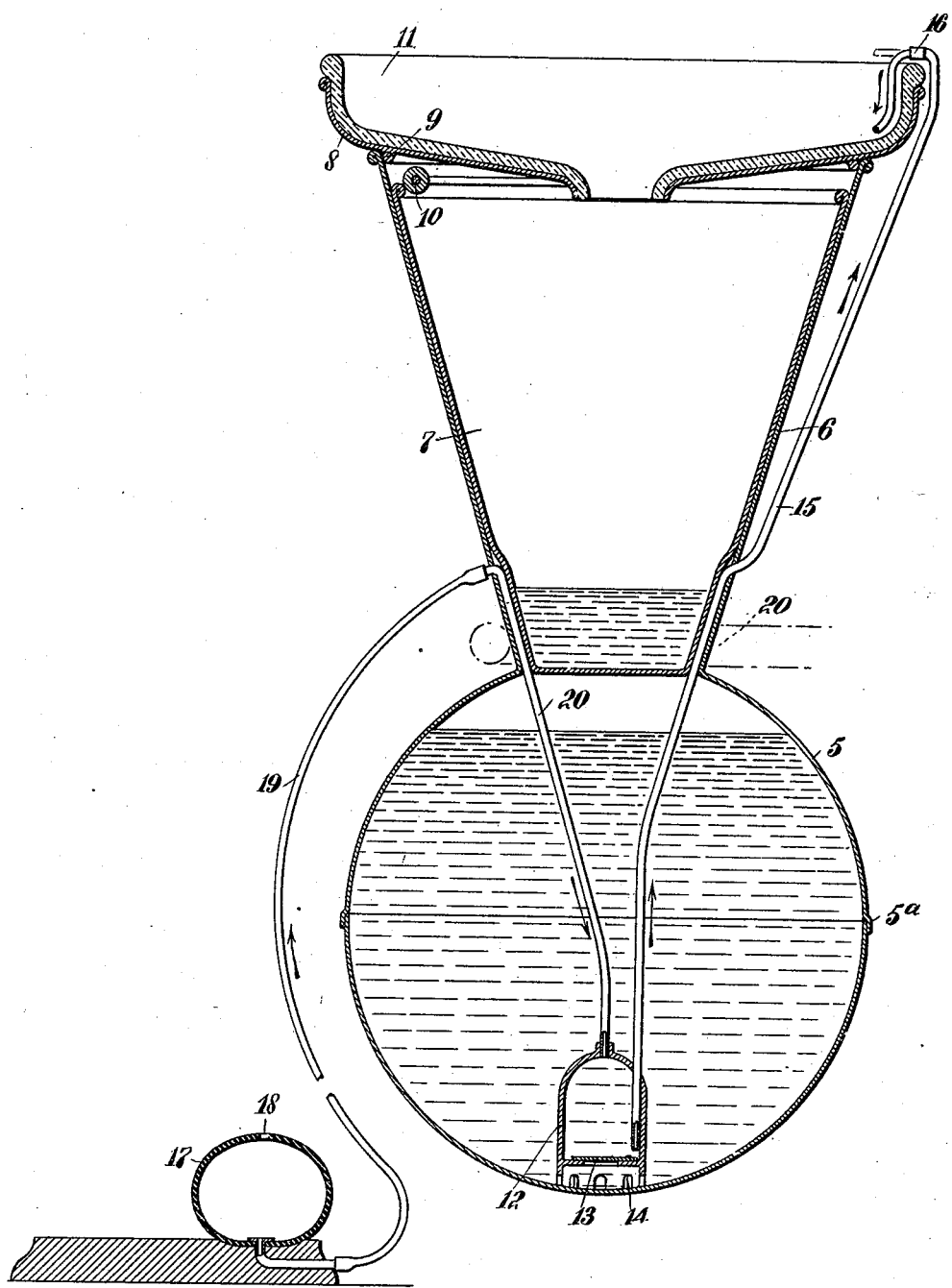
WITNESSES
Edward Thorpe
INVENTOR
James D. Wilson
BY
ATTORNEYS

UNITED STATES PATENT OFFICE.

JAMES DAWSON WILSON, OF WEBSTER GROVES, MISSOURI.

FOUNTAIN-CUSPIDOR.

975,308. Specification of Letters Patent. Patented Nov. 8, 1910.

Application filed August 11, 1909. Serial No. 512,330.

*To all whom it may concern:*

Be it known that I, JAMES DAWSON WILSON, a citizen of the United States, and a resident of Webster Groves, in the county of St. Louis and State of Missouri, have invented a new and Improved Fountain-Cuspidor, of which the following is a full, clear, and exact description.

The invention is an improvement in fountain cuspidors as are used by dentists and others, and has in view a construction embodying a saliva receptacle, a basin or bowl forming the mouth of the receptacle, a water reservoir upon which the said receptacle is seated, a chamber at the bottom of the reservoir provided with a water inlet valve, a discharge conduit leading from the lower portion of the chamber to the bowl, and an air compressor discharging into the chamber to expel the water therein into the bowl through the conduit.

Reference is to be had to the accompanying drawing forming a part of this specification, wherein is shown in central vertical section a cuspidor constructed in accordance with my invention.

The cuspidor in its preferred embodiment has a water reservoir 5, shown to be of spherical form and made of two half sections connected together at the joint 5ª, the upper section having a funnel-shaped body 6 joined to the top thereof, in which is seated a correspondingly-shaped saliva receptacle 7. A bowl or basin 8 seats on the top of the body 6 and discharges at the center into the receptacle 7, the bowl being removably held in place by a ring 9 secured to its under side and closely fitting into the mouth of the body 6. The reservoir, funnel-shaped body, saliva receptacle and bowl 8 are ordinarily of spun metal, the receptacle being provided with a handle 10 by which it is lifted from the funnel-shaped body, and the handle being constructed to fold within the body below the bowl, as shown in the drawing figure. A bowl or basin 11 of glass or other suitable material is seated in and conforms to the metal bowl 8, the metal bowl serving as a support for the glass and preventing the saliva or water from leaking out and running down the side of the cuspidor should the glass be cracked or broken.

In the bottom of the reservoir is a water chamber 12, the bottom proper of the chamber being arranged a slight distance above the bottom of the reservoir and provided with a water inlet valve 13, the water being free to pass from the reservoir underneath this valve through a number of openings 14 in the casing by which the walls of the chamber are formed. Leading from a point near the bottom of the chamber is a discharge conduit or tube 15 which passes between the body 6 and the receptacle 7 at the lower portions thereof and thence extends through the body 6 and over the top edge of and into the bowl 11, a union 16 being provided in the conduit at the top edge of the bowl in order that that portion or section of the conduit within the bowl may be swung upwardly out of the way when the bowl is removed, the discharge end of this portion of the conduit when in operative position being directed to cause the water to flow around the inclined bottom of the bowl one or more times before passing into the saliva receptacle.

An air compressor, which in the embodiment of my invention shown is in the nature of a compressible bulb 17 having a vent opening 18 at the top, discharges into the upper portion of the water chamber 12, the air being conducted through a flexible tube or hose 19 and a tube or pipe 20, the latter extending from a point at the outside of the funnel-shaped body 6 between this body and the receptacle 7, similarly to the conduit 15, the saliva receptacle 7 being reduced in diameter or grooved at the lower portion for this purpose. The bulb 17 is preferably, though not necessarily, foot-actuated, in which operation the foot closes the vent-opening 18 and forces the air in the bulb into the water chamber 12, discharging the water contained therein through the tube 15 into the bowl 16 to wash saliva and other refuse thereon into the receptacle 7. On releasing the bulb 17 it is instantly inflated by reason of the resiliency of its walls and the air rushing in through the vent opening 18. The water pressure in the reservoir lifts the valve 13 and again fills the water chamber, the air passing out of the latter through the pipe 20 and tube 19 when the cuspidor is once more in readiness for operation. The cuspidor when used by a dentist will ordinarily be supported by the usual forked bracket 20 of the chair, shown in dotted outline in the drawing figure, the fork engaging the funnel-shaped body 6 close to the reservoir 5.

Having thus described my invention, I claim as new and desire to secure by Letters Patent:

1. The combination in a cuspidor, of a saliva receptacle having a bowl discharging therein, a water reservoir, a water chamber having a discharge conduit passing to the bowl and provided with a valve-controlled inlet opening leading from the reservoir, and an air compressor discharging into the chamber to force the water therein through the conduit into the bowl.

2. The combination in a cuspidor, of a saliva receptacle having a bowl discharging therein, a water reservoir on which the receptacle is seated, a water chamber within the reservoir, having a discharge conduit passing to the bowl, and an air compressor discharging into the chamber to force the water therein through the conduit into the bowl.

3. The combination in a cuspidor, of a saliva receptacle having a bowl discharging therein, a water reservoir arranged below the bowl, a water chamber arranged in the lower portion of the reservoir, having an inlet valve for the water, a conduit leading from the lower portion of the chamber to the bowl, and an air compressor discharging into the upper portion of the chamber.

4. The combination in a cuspidor, of a water reservoir, a saliva receptacle seated on the reservoir, a bowl supported over the receptacle and discharging therein, a water chamber arranged within the reservoir, having a valve-controlled inlet for the water, a conduit leading from the chamber to the bowl, and an air compressor discharging into the chamber to deliver the water from the chamber into the bowl through said conduit.

5. The combination in a cuspidor, of a water reservoir, a saliva receptacle arranged above the reservoir and having a bowl discharging therein, a casing arranged at the bottom of the reservoir, said casing having water inlet openings at the lower portion thereof and provided with a water chamber above said openings, with the bottom of the chamber having a water inlet valve, a compressible air bulb discharging into the upper portion of the chamber, and a conduit leading from the lower portion of the chamber to the bowl.

In testimony whereof I have signed my name to this specification in the presence of two subscribing witnesses.

JAMES DAWSON WILSON.

Witnesses:
O. M. OGDEN,
F. J. PAULUS.